United States Patent [19]
Chapman

[11] 3,761,163
[45] Sept. 25, 1973

[54] VERNIER AZIMUTH GIMBAL SUSPENSION SYSTEM

[75] Inventor: Arthur S. Chapman, Rolling Hills, Calif.

[73] Assignee: Hughes Aircraft Company, Culver City, Calif.

[22] Filed: Apr. 10, 1972

[21] Appl. No.: 242,450

Related U.S. Application Data

[63] Continuation-in-part of Ser. No. 884,928, Dec. 15, 1969, abandoned.

[52] U.S. Cl..................... 350/301, 350/85, 250/203
[51] Int. Cl. .............................................. G02b 5/08
[58] Field of Search 350/21-26, 48-53, 80, 85, 301; 356/149; 250/203; 74/51, 5; 248/182

[56] References Cited
UNITED STATES PATENTS

| | | | |
|---|---|---|---|
| 1,580,298 | 4/1926 | Henderson | 350/85 |
| 2,462,925 | 3/1949 | Varian | 250/203 |
| 2,961,191 | 11/1960 | Jasperson | 250/203 |
| 3,001,289 | 9/1961 | Carbonara | 250/203 |
| 3,266,152 | 8/1966 | Hundhausen | 350/85 UX |

Primary Examiner—David Schonberg
Assistant Examiner—Michael J. Tokar
Attorney—W. H. MacAllister et al.

[57] ABSTRACT

Low friction characteristics are provided in a vernier gimbal mount for a sighting device whose optical path passes through the center of its gimbal bearings. The optical system is so designed that an image is formed near the gimbal center on its inner gimbal. The mount includes an outer gimbal member with first and second ends which must be pivotally supported on a platform, the first end of the outer member having a wide optical passageway extending through its axis of rotation. To provide for small friction in the bearings at the wide optical passageway, a pair of links pivotally couple the first end of the outer member to platform, each link having one end pivotally mounted on the platform and another end pivotally mounted on the outer member at a point outside the passageway. The inner gimbal member is pivotally supported on the outer member by bearing parts which are placed on opposite sides of the outer member and which are secured together by arms extending through slots in the outer member.

12 Claims, 6 Drawing Figures

VERNIER AZIMUTH GIMBAL SUSPENSION SYSTEM

BACKGROUND OF THE INVENTION

This application is a continuation-in-part of copending application, Ser. No. 884,928, filed Dec. 15, 1969, now abandoned.

The invention herein described was made in the course of or under a contract of subcontract thereunder, with the Department of Defense.

FIELD OF THE INVENTION

This invention relates to low friction bearing support for gimbal apparatus in optical systems and, more particularly, to such bearing support so placed as to permit the system optical path to pass through the center of the gimbal apparatus as a small beam, near the image plane, and to exit the apparatus as a relatively large beam.

DESCRIPTION OF THE PRIOR ART

Opitcal sights, which are used on helicopters and other vehicles, can be space stabilized to view in a particular direction regardless of vehicle pitch and roll. Sighting is accomplished in some systems by the use of a pair of mirrors for reflecting light to an eye-piece or other detector that may be fixed to the vehicle or a platform on the vehicle. The mirrors are mounted on a gimbal system that rotates to compensate for the effects of vehicle turning.

The gimbal system includes an outer gimbal pivotally mounted on the vehicle and an inner gimbal pivotally mounted on the outer gimbal, each gimbal carrying a mirror. The inner gimbal mirror reflects light through the axis of rotation of the inner gimbal, while the outer gimbal mirror reflects light through the axis of rotation of the outer gimbal to a detector or an ocular on the vehicle. Because light diverges as it passes through the gimbal system, one of the bearings that pivotally couples the inner and outer gimbals and one of the bearings that pivotally couples the outer gimbal to the vehicle must have wide passageways at their centers. However, large diameter bearings result in increased frictional torque which militates against the accuracy of stabilization.

In one type of optical sight, the gimbal system is mounted on a platform that is pointed at a target as accurately as possible, so that the gimbal need only be required to make fine corrections of the gimbal such as less than a few degrees. It is desirable that the gimbal construction for such vernier gimbal systems have a minimum value of friction while providing a wide passageway for the optical path along the axes of gimbal rotation. Since the optical path typically diverges between the inner gimbal and the detector on the platform, the passageway must be especially wide only at the bearing which couples the inner gimbal to the platform.

OBJECTS AND SUMMARY OF THE INVENTION

An object of the present invention is to provide a low friction vernier gimbal system having a wide optical passageway along its axis.

Another object is to provide a vernier gimbal system for an optical sight having maximum rigidity of the constituent gimbal parts.

In accordance with the invention, a vernier gimbal assembly is provided with a minimum of friction and a maximum of stability. The assembly includes an outer gimbal member with first and second opposite ends which are pivotally mounted on a platform that is supported on a vehicle. The outer gimbal member has a mirror, prism, or the like which receives light at one side of the gimbal member and reflects the light through the member's first end. The first end has a wide unobstructed passageway along its axis of rotation to accommodate a wide beam from the mirror. The bearing assembly of the first end includes a pair of links, each having one end pivotally connected to the platform and the other end pivotally connected to the outer gimbal member. The links confine the outer gimbal member to substantially rotational movement for small degrees of pivoting, yet each end of the link has a small diameter bearing to keep friction to a minimum.

The gimbal assembly also includes an inner gimbal member with opposite ends pivotally mounted on opposite sides of the outer gimbal member. One of the ends of the inner member, which views the target, extends beyond the boundaries of the outer member. The ends of the inner member are coupled together by a plurality of arms that extend through slots in the outer member.

Other aims and objects, as well as a more complete understanding of the present invention, will appear from the following explanation of an exemplary embodiment and the accompanying drawings thereof.

DESCRIPTION OF THE PREFERRED EMBODIMENTS

Figure 1:
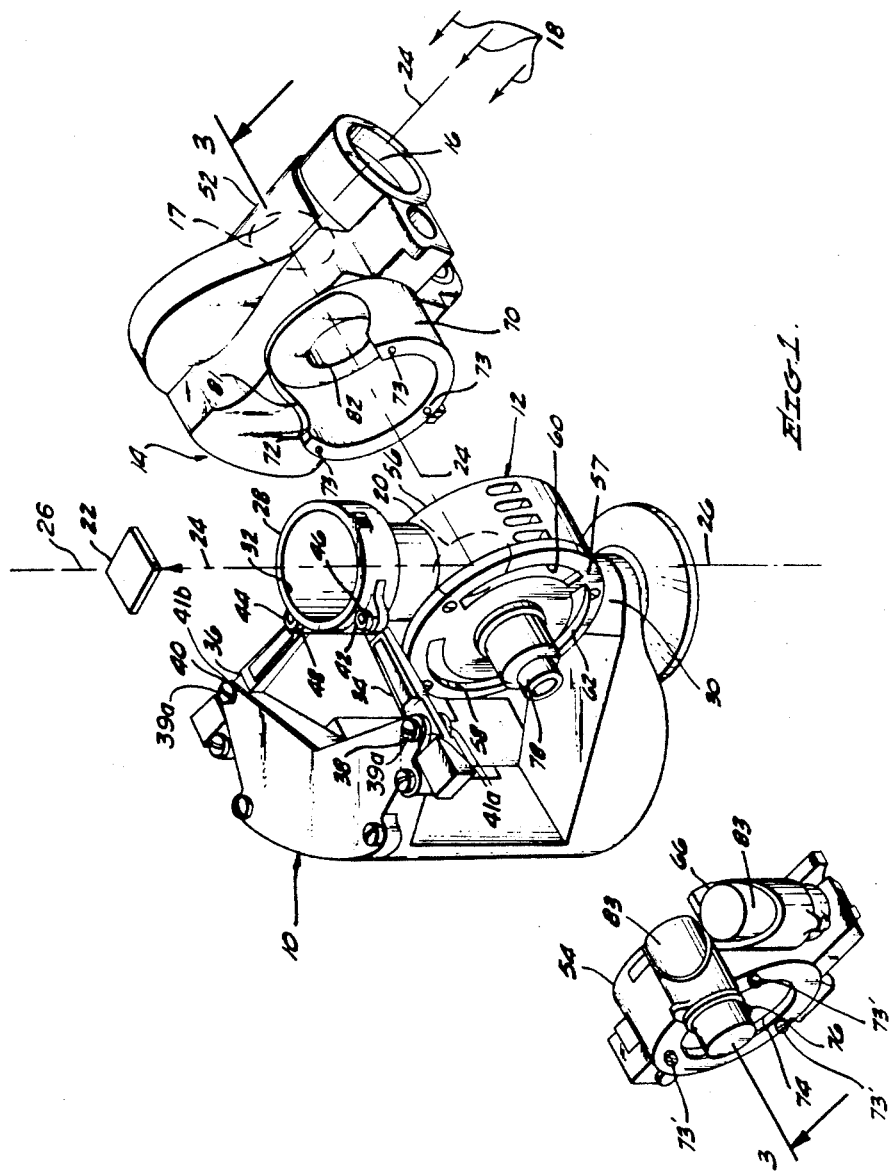
FIG. 1 is an exploded perspective view of an optical sight which employs a vernier gimbal suspension system constructed in accordance with the invention.

FIGS. 1, 2, 5 and 6 illustrate part of an optical sight which may be mounted on a helicper or other vehicle to track a missile. The sight includes a platform 10, of which only a portion is shown, and which is pivotally mounted on the vehicle. An outer gimbal member 12 is pivotally mounted on and to the platform by pivoted links 34 and 36 at one end 28 and by bearings at its other end 30. The center line or axis of rotation of the outer gimbal is denoted by numeral 26, as shown in FIGS. 1–3 and 5. An inner gimbal member 14 is pivotally mounted on the outer gimbal member. The inner gimbal member 14 includes a lens assembly 16 which views a target or other area and an elliptical mirror 17, which is shown at an angle, giving the appearance of a circle, that reflects a light beam 18 passing through the lens assembly along the axis of the inner member 14. Lens 16 forms an image of the target or other area on the inner gimbal 14 bear an inner gimbal bearing 19 (see FIG. 3). Thus, the diameter of beam 18 is kept at a minimum as depicted by indicia 18a as it passes through the bearing. This image is relayed to an observer or a detector 22 by other optical means which includes a mirror 20 on the outer gimbal member. Mirror 20 axially reflects the light, which at this point diverges as shown by indicia 18b. The detector or an ocular, represented at 22, is coupled to the platform 10 by direct mounting thereon, although it could be coupled through an additional mirror. In some systems a prism or other reflecting means may be used to deflect light instead of an ordinary mirror.

The platform 10 is mounted on the vehicle in a manner that allows it to be pivoted manually or by a servo system so that the lens 16 can be pointed to within a few degrees of a position that is exactly on target. The function of the pivotally mounted inner and outer gimbal members 14 and 12 is to stabilize the view so that it does not vibrate in or vary from the exact target direction due to disturbances of the vehicle. Thus, the gimbal mount apparatus is of the vernier type which is designed for only a few degrees of rotation.

Since the optical path 24 of the system must extend through the axes of rotation of the gimbal members, that portion of the optical path 24 between the mirror 20 and one end 28 of the mount must coincide with the axis of rotation 26 of the outer gimbal member. While a small diameter bearing can be used at one end 30 of the member 12, because the optical path passes through a wide aperture end 28 having a passageway 32, this end must be sufficiently large, which, in turn, would require the use of a large diameter bearing. However, if an ordinary ball bearing were used in the large bearing at the end 28 of the outer mount member, friction in the bearing would result in substantial frictional torque that would prevent almost free rotation of the member on the platform 10. This friction would then reduce the sensitivity of the gimbal mount apparatus and result in poor performance of the system. The stabilization of the system would be degraded and a greater portion of disturbances of the vehicle would remain uncorrected.

In accordance with the present invention, a large diameter bearing is not required at the wide diameter passageway 32 of the end 28 along part of the axis of rotation of the outer gimbal member 12, thus avoiding the aforementioned substantial frictional torque which would have otherwise prevented almost free rotation of the member. The bearing assembly for the end 28 of the outer member includes a pair of links 34 and 36 that extend between the platform 10 and the end 28 of the outer gimbal member 12 to couple them together. The links have outer ends rotatably connected by pivots 38 and 40 to ears 41a and 41b on platform 10, and inner ends, rotatably connecged by pivots 42 and 44 to brackets 46 and 48 on outer gimbal member 12 near its end 28. All pivots 38, 40 42 and 44 illustratively comprise bolts 39a extending through holes in ears 41a and 41b of platform 10, links 34 and 36, and brackets 46 and 48 on gimbal end 28, in a manner well-known in the art. Nuts 39b are threaded to the bolts to prevent removal of the bolts from the holes. Each of the bearings at pivots 38, 40, 42, and 44 where the links are coupled to the platform and to the gimbal member are of small diameter and, therefore, permit substantially free movement of the links.

Figure 2:
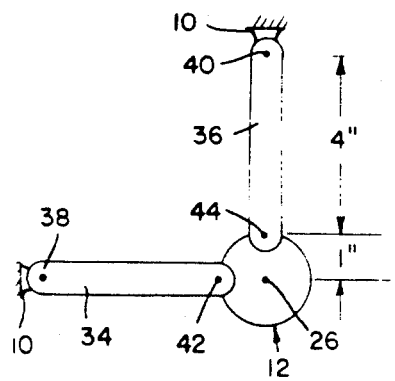
FIG. 2 is a representational view of the connection of the outer gimbal at its large optical opening to the platform depicted in FIG. 1, showing its manner of operation.
Figure 3:
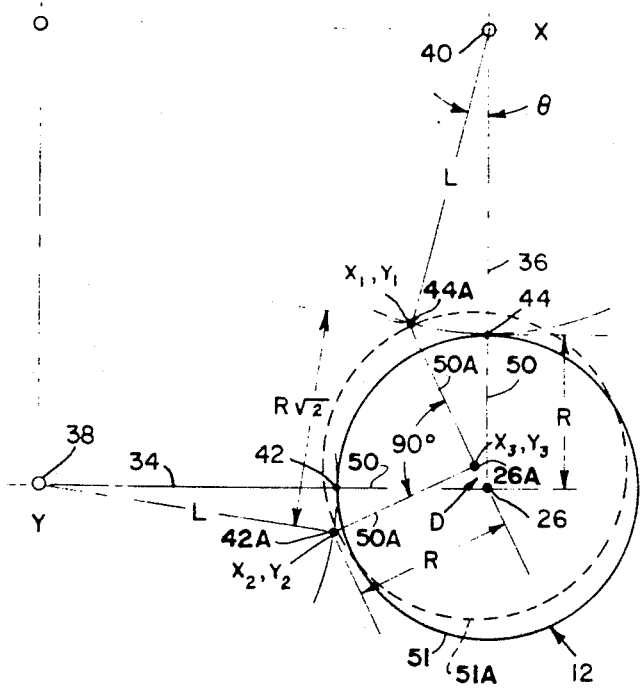
FIG. 3 is a geometric representation of the representational view of the outer gimbal depicted in FIG. 2.

For small degrees of pivoting of gimbal member 12, the links 34 and 36 confine the member to substantially pivotal movement about its axis of rotation 26. The manner of operation of the links is illustrated in FIGS. 2 and 3, in which FIG. 3 shows the outer gimbal member 12 in two positions. The first position is represented by an imaginary line 50 which is the radius of a circle 51 passing through pivots 42 and 44 and having its center on axis 26. The second position is denoted by rotation and translation of the circle and its radius with resct to pivots 38 and 40 and platform 10 to dashed radius position 50A and dashed circle position 51A, centered about radius 26A. As a result of rotation of the line to position 50A, the position of the pivots 42 and 44 move to positions 42A and 44A as links 34 and 36 slightly rotate in their pivots 38, 40, 42 and 44. For small amounts of rotation of the outer gimbal member, the links 34 and 36 confine member 12 to a movement in a substantially rotational manner about its axis 26 with a slight consequential swinging translation of the axis about bearing end 30 from axis location 26 to axis location 26A; however, this translation is negligible for small rotations of less than a few degrees which are to be imparted to the outer gimbal member, as will be described in greater detail below. Thus, a pair of pivotally mounted links can be used to confine a gimbal member to substantially pivotal movement, for small degrees of rotation.

It is generally preferable to employ only two links to couple the platform to the end 28 of the outer gimbal member. If a third link is employed with ends having moderately tight bearings which have substantially no play in them, then rotation of the gimbal member 12 may be confined to only a fraction of a degree. The links 34 and 36 are shown oriented perpendicular to each other, as this orientation provides relatively good support for the end 28 of the gimbal member while permitting appreciable rotation, such as up to a few degrees. If the link 34 were moved closer to link 36, so that pivots 42 and 44 were much less than 90° apart, then the outer end 28 of the gimbal member would not be as well supported, and the pivotal mounting might not be adequately rigid.

Figure 4:
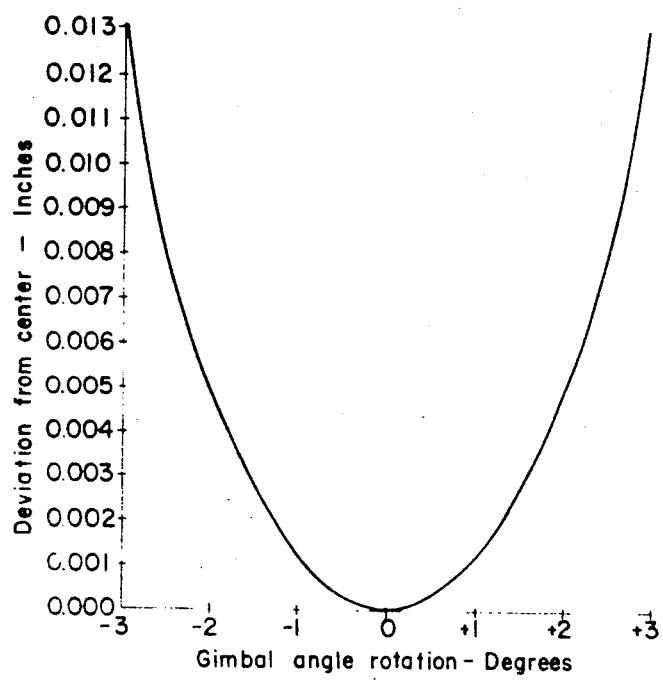
FIG. 4 is a graph of the deviation from the center versus gimbal angle rotation of the present invention.

In order to appreciate the rotational capabilities of the present invention, reference is made to FIG. 3 and the following mathematical description where X and Y define a coordinate system with the pivots 38 and 40 lying on these axes. The Arms 34 and 36 are represented by length L and the distance from the center on axis 26 of outer gimbal member 12 to pivots 42 and 44 is represented by R, and 42 and 44 are displaced 90° on a circle of radius R. Link 36 is now rotated through an angle $\theta$ and all other members are shown in their new position. A series of equations based on the pythagorean theorem can now be written to describe the coordinates of pivots 44, 42, and the new center of member 12. These coordinates bear the subscripts 1, 2, and 3, respectively. The equations involving the pivots and link are as follows:

1. $L + R = X = Y$
2. $X_1 = X - L\sin\theta$
3. $Y_1 = Y - (Y - L\cos\theta)$
4. $X_2^2 + (Y_2 - (L+R))^2 = L^2$
5. $(X_1 - X_2)^2 + (Y_2 - Y_1)^2 = 2R^2$
6. $(X_3 - X_1)^2 + (Y_3 - Y_1)^2 = R^2$
7. $(X_3 - X_2)^2 + (Y_3 - Y_2)^2 = R^2$
8. $(X - X_3)^2 + (Y - Y_3)^2 = D^2$ 9. Rotation of member 12 = ARCTAN $Y_3-Y_1/X_3-X_1$
For any given configuration, values will be established for $L$ and $R$ and $\theta$, and $X_1$ and $Y_1$ can be determined using equations (1), (2), (3). Substituting these values in equations (4) and (5) allows those equations to be solved for $X_2$ and $Y_2$, since there are two equations and two unknowns. Similarly, $X_2$ and $Y_2$ can be substituted in equations (7) and together with equation (6), values may be established for $X_3$ and $Y_3$. The change in position of the center from the idealized center is at position D and is expressed in equation (8). The angle of rotation of member 12 can be found by equation (9). Hence, a plot of the deviation of the center from the idealized center as a function of the rotation angle of member 12 or link 36 can be constructed for any given geometry. In actual practice, these equations expand to difficult-to-handle equations and are best addressed with the aid of a computer. A sample analysis was conducted to show the variation in center distance for a geometry in which $L = 4$ inches and $R = 1$ inch and the result is shown in FIG. 4.

Referring again to FIGS. 1, 5, and 6, the inner gimbal member 14 must be pivotally mounted on the outer member 12 in a manner that provides substantial rigidity. However, one end 52 of the inner member 14 must extend substantially outside of the boundaries of the outer bimbal member 12 to permit the lens system 16 to have an unobstructed view of the target. It would be possible to mount the inner gimbal member 14 in a cantilever fashion on just one side of the outer member 12, but such mounting would normally result in a coupling that was less rigid than is required. Furthermore, a cantilever mounting would generally require two medium-sized bearings to provide a passageway for divergence of the beam along the optical path 24.

In accordance with the invention, the inner gimbal member 14 is provided with two ends 52 and 54 which are mounted on opposite sides 56 and 57 of the outer gimbal member 12. In order to connect the opposite sides 52 and 54 of the inner member, the outer gimbal member 12 is provided with three slots 58, 60, and 62, extending between its opposite sides, and the inner gimbal member is provided with three arms, 64, 66, and 68 that pass through the slots to couple the two ends 52 and 54 together. The inner member 14 has a casing portion 70 with a flange 72 that extends through the outer member 12, which has holes 73, which may be threaded to receive fasteners 73' passing through the end 54 and into the arms 64, 66, and 68 to the flange, although other fastening means may be used.

The slots 58, 60, 62 are sufficiently wide, with respect to the arms 64, 66, 68, to permit several degrees of rotation of the inner member 14 with respect to the outer member 12. A face 74 of the end 54 has a race 76 which is journalled on a small diameter extension 78 of outer member 12. Although shown as a simple bearing, ball, roller or other bearings may be utilized in place of race 76 and extension 78. The small diameter of the bearing formed by parts 76 and 78 keeps frictional torque to a minimum to allow sensitive space stabilization. The other end 52 of the inner gimbal member is coupled to the outer member by the bearing 19 that includes a male bearing part 80 that is pivotally coupled to a female part 82 on the outer member. The bearing parts 80 and 82 form a moderately large size bearing which has the disadvantage of slightly reducing the sensitivity of space stabilization. However, the diameter of the bearings 19 can be relatively small because the optical path is still of small diameter relative to its passage through the end 28 of the outer gimbal member.

The case portion 70 of the inner gimbal member is of annular shape and has a cutaway portion 81 on either side of the optical path between the mirror 20 and end 28 of the outer gimbal member to prevent obstruction of the light beam. However, the annular shape of case portion 70 serves as a rigid beam that firmly connects the ends 52 and 54 of the inner gimbal member to provide a rigid coupling. The inner gimbal member therefore has a rigid pivotal coupling to the outer gimbal member, with a minimum of frictional torque, in a construction that provides an unobstructed optical path along the axis of rotation.

Figure 5:
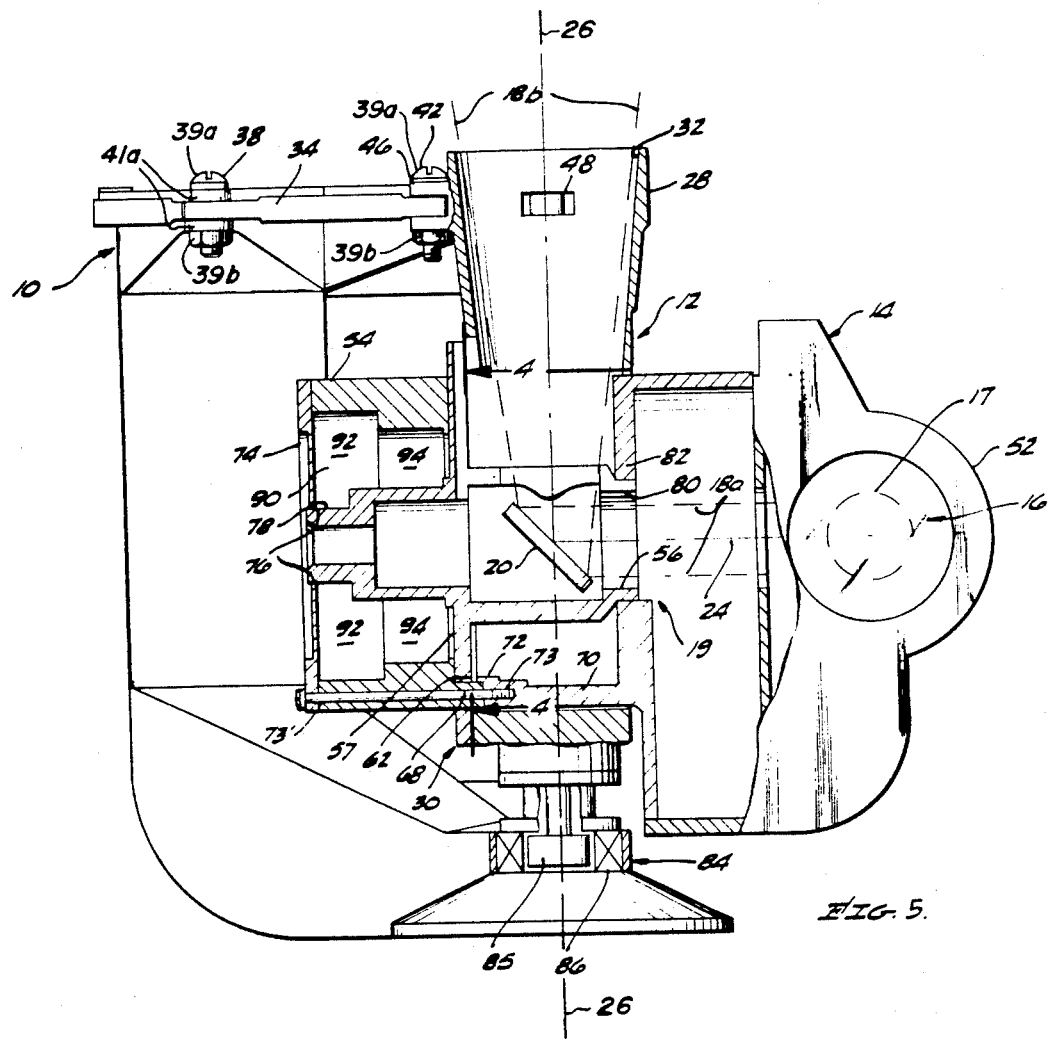
FIG. 5 is a sectional view taken on the line 5—5 of FIG. 1.
Figure 6:
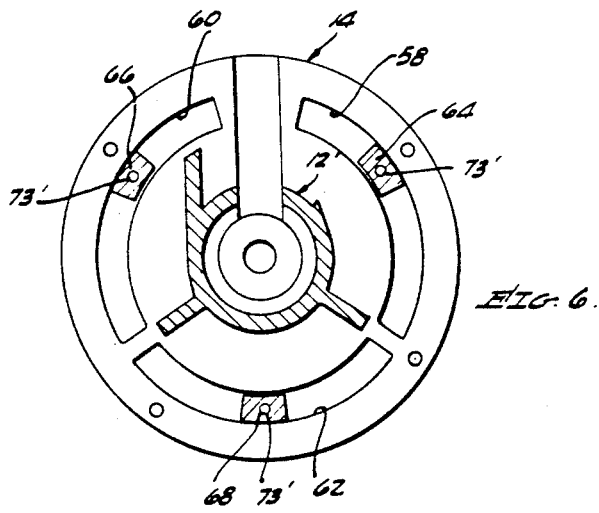
FIG. 6 is a sectional view taken on the line 6—6 of FIG. 5.

The motor mechanisms for pivoting the outer and inner gimbal members relative to each other and to the platform 10 are well-known in the art. Gyroscopes 83 are mounted on the inner member to sense rotational disturbances. The outputs of these gyroscopes can be delivered to a sensing circuit on the platform through flexible wires, the use of flexible wires being possible because of the limited amount of gimbal rotation. The sensing circuit on the platform generates currents that drive motors to pivot the gimbals so as to cancel out rotational disturbances of up to a few degrees. FIG. 5 shows a direct drive motor 84 with an armature 85 on the outer gimbal member 12 and field structure 86 on the platform to pivot the outer member 12 in either direction by up to a few degrees. Another direct drive motor 90 with an armature 92 on the outer gimbal member and field structure 94 on the inner member 14 can pivot the inner member by approximately 90°, the limits being determined by the arcuate lengths of slots 58, 60, and 62.

Thus, the invention provides a vernier gimbal mount for an optical system which has low frictional torque to provide maximum stabilization sensitivity, while also providing large diameter passageways for the optical axes. This is accomplished by the use of a pair of pivotally mounted links as the bearing for one end of a gimbal member, and by the use of arms that couple opposite ends of the gimbal member to permit the member to be pivotally supported at each end using relatively small diameter bearings.

Although particular embodiments of the invention have been described and illustrated herein, it is recognized that modifications and variations may readily occur to those skilled in the art, without departing from the spirit and scope of the invention.

I claim:

1. A vernier azimuth gimbal suspension system comprising:

an optical sighting device mounted on a carrier;
a platform coupled to and included in said optical sighting device;
a first axis and a substantially tubular outer gimbal member having first and second ends centered about the first axis, said outer gimbal member pivotally mounted by first pivot means on said platform at said ends for slight angular and translational movement with respect to said platform about the first axis, and said outer gimbal member having opening means therein at said first end;

a second axis and an inner gimbal member pivotally mounted by second pivot means on said outer gimbal member about the second axis;

a lens assembly having coupling means, said coupling means coupling said lens assembly to said inner gimbal member for viewing a target, said lens assembly including first reflector means for reflecting electromagnetic wave energy from the target along the second axis of said inner gimbal member in an optical path narrow with respect to said opening means of said outer gimbal member;

optical means including second reflector means coupled to said outer gimbal means for reflecting the electromagnetic wave energy from said first reflector means to receiving means adjacent said opening means of said outer gimbal member, said receiving means capable of receiving the reflected electromagnetic wave energy in an optical path having an aperture wide with respect to the aforementioned narrow optical path through said opening means of said outer gimbal member; and first bearing and support means including said second pivot means pivotally supporting said inner gimbal within said outer gimbal and second bearing and support means including said first pivot means supporting said first and second ends of said outer gimbal to said platform, said second bearing and supporting means at said first end of said outer gimbal positioned at said large opening means and comprising a first pair of brackets secured to said first end, said first pair of brackets positioned at substantial right angles from one another, a second pair of brackets secured to said platform, said first and second pair of said brackets facing one another, and a pair of straight links pivotally secured by pivotal connections respectively to said facing brackets of said first and second pair of brackets, said links positioned at substantially right angles to one another with center lines therethrough crossing at the first axis of said outer gimbal member, and said links to brackets pivotal connections having an interfitting connection of sufficient close tolerance as to permit only rotation between said links and their respective brackets whereby rotation of said outer gimbal with respect to said platform includes a consequential translation therebetween.

2. Gimbal apparatus for an optical system comprising:

a first member;

a second member having first and second ends and having an axis extending centrally through said ends, said second member having means at said second member ends pivotally mounting said second member on said first member about the axis, and said second member having optical passageway means extending along the axis through at least said first end; and said pivotally mounting means including a pair of links, each said link having ends pivotally connected to said first member and to said first end of said second member by means of sufficient close tolerance as to permit a combined rotational and translational movement of said second member with respect to said first member.

3. The gimbal apparatus described in claim 2 including:

a third member for pivotal mounting on said second member about a second axis which is perpendicular to the first axis, said third member including first and second parts located outside of opposite sides of said second member, first and second bearings pivotally connecting said first and second parts of said third member with said second member, and a plurality of arm means connecting said first and second parts together; and wherein said second member has means defining a plurality of slots through which said arm means pass.

4. The gimbal apparatus described in claim 2 wherein:

said links are oriented approximately perpendicular to each other.

5. Gimbal apparatus for an optical system comprising:

platform means with detector means coupled thereto;

a first gimbal member having body means, said body means provided with first and second opposite end portions and first and second opposite sides, and said opposite sides provided with a plurality of slot means;

first reflecting means mounted on said first gimbal member for deflecting electromagnetic energy toward said detector means through said first end of said first gimbal member;

a second gimbal member having first and second end portions pivotally mounted on said first and second sides, respectively, of said first gimbal member, and having a plurality of arms extending through said slot means for coupling said first and second end portions of said second member; and second reflecting means mounted on said second gimbal member for deflecting the electromagnetic energy from an area being viewed toward said first reflecting means.

6. The gimbal apparatus described in claim 5 wherein:

said first end of said first gimbal member has wide unobstructed passageway means for permitting the passage of the electromagnetic energy from said first reflecting means toward said detector; and including a pair of links for pivotally coupling said first end of said first gimbal member to said platform means, each said link having one end pivotally mounted on said platform means and an opposite end pivotally mounted at said first end of said first gimbal member outside of said passageway means.

7. The gimbal apparatus described in claim 5 wherein:

said second gimbal member has a casing portion extending from said second end thereof to said arms, said casing portion having an annular shape which extends about said first reflecting means only to positions on either side of the path of the electromagnetic energy connecting said first reflecting means and said first end of said first gimbal member.

8. A vernier gimbal optical system comprising:

platform means;

detector means coupled to said platform means;

an outer gimbal member having means, including pivot means, mounting said outer gimbal member in substantially a rotational movement about an axis of rotation relative to said platform means, said member having first and second ends spaced from one another and reflecting means mounted on said outer gimbal member between said ends for deflecting electromagnetic energy along a path that extends along a portion of the axis through said first end toward said detector means, said first end having a ring-shaped portion with a pair of pivot points spaced approximately 90° from one another about the axis, and said second end having a bearing surface of smaller diameter than said ring-shaped portion for pivotal coupling to said platform means; and a pair of links, each having opposite ends pivotally coupled to said platform means and to each of said pivot points on said ring-shaped portion, respectively, by said pivot means, said pivot means having a construction enabling substantially pure swivelled movement between said links and said platform means and pivot points, respectively, and enabling the movement of said outer gimbal member with respect to said platform means in substantially the rotational movement.

9. The system described in claim 8 wherein:

said outer gimbal member has first and second opposite sides and slots extending between said sides; and including an inner gimbal member having a first end portion for viewing a target area, second reflecting means on said first end portion for deflecting the electromagnetic energy from said area to said first reflecting means, and a bearing for pivotal mounting on said first side of said outer gimbal member, said inner gimbal member also having a second end portion pivotally mounted on said second side of said outer gimbal member, and a plurality of arms extending through said slots for coupling said first and second ends of said inner gimbal member.

10. A pivot apparatus comprising a first member fixed with respect to an axis, a second member movable about the axis with movement in a substantially rotational manner, a first link pivotally connected in rotatable pivot means at its ends to and between said first and second members and a second link spaced from said first link and pivotally connected in rotatable pivot means at its ends to and between said first and second members, said first and second links being so connected to said first and second members as to limit the movement in the substantially rotational manner with slight translation of said second member about the axis as said first and second links rotatably pivot in their pivot means.

11. An apparatus as in claim 10 wherein said links are spaced approximately 90° from one another.

12. An apparatus as in claim 10 wherein both said links substantially lie in a plane passing through the axis and orthogonal thereto.

* * * * *